(12) United States Patent
Leedom et al.

(10) Patent No.: US 9,500,498 B1
(45) Date of Patent: Nov. 22, 2016

(54) DYNAMIC PRIMARY FLIGHT DISPLAY ANNUNCIATIONS

(75) Inventors: David L. Leedom, Center Point, IA (US); Thomas W. Cline, Fairfax, IA (US); David M. Esno, Swisher, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 13/488,529

(22) Filed: Jun. 5, 2012

(51) Int. Cl.
*G01C 23/00* (2006.01)

(52) U.S. Cl.
CPC ..................................... *G01C 23/00* (2013.01)

(58) Field of Classification Search
CPC .. G01C 23/00; G01C 23/005; G08G 5/0021; G08G 5/0013; G05D 1/0077
USPC ........... 701/1, 11, 110, 120, 14, 15, 16, 3, 5, 701/506, 528, 99; 715/771; 340/971, 973, 340/974, 975
See application file for complete search history.

(56) References Cited

U.S. PATENT DOCUMENTS

| | | | |
|---|---|---|---|
| 5,978,715 A * | 11/1999 | Briffe | G05D 1/0808 244/1 R |
| 6,262,720 B1 * | 7/2001 | Jeffrey | G05B 23/0272 715/202 |
| 8,159,464 B1 * | 4/2012 | Gribble et al. | 345/173 |
| 8,264,376 B1 * | 9/2012 | McLoughlin et al. | 340/945 |
| 2003/0025682 A1 * | 2/2003 | Dame | G08G 5/0021 345/184 |
| 2004/0210847 A1 * | 10/2004 | Berson | G01D 7/08 715/788 |
| 2008/0262664 A1 * | 10/2008 | Schnell et al. | 701/4 |
| 2013/0076540 A1 * | 3/2013 | McLoughlin et al. | 340/945 |

* cited by examiner

*Primary Examiner* — Jelani Smith
(74) *Attorney, Agent, or Firm* — Angel B. Gerdzhikov; Donna P. Suchy; Daniel M. Barbieri (57) ABSTRACT

A system for providing dynamic primary flight display flags includes a display device, a user interface device, and a processor configured to: receive at least one instrumentation parameter, display one or more primary flight display annunciations in the primary flight display area of the display device in response to the received at least one instrumentation parameter, receive one or more signals from the user interface device indicative of a user selection of the displayed one or more primary flight display annunciations, retrieve one or more checklists corresponding to the one or more primary flight display annunciations, and display the one or more checklists corresponding to the one or more primary flight display annunciations in response to the received signal indicative of a user selection of the one or more primary flight display annunciations.

18 Claims, 9 Drawing Sheets

DYNAMIC PRIMARY FLIGHT DISPLAY ANNUNCIATIONS

TECHNICAL FIELD

The present invention generally relates to primary flight display annunciations on a cockpit display of an aircraft, and more particularly to a system and method for providing dynamic primary flight display flags on a primary flight display of an aircraft.

BACKGROUND

As the complexity of aircraft continues to increase, so does the need for improved aircraft instrumentation. Typically, an electronic instrumentation system includes at least one primary flight display (PFD), at least one multifunction display (MFD), and a crew alerting system (EICAS) display. In the case of an instrumentation failure or malfunction, instrumentation systems typically provide an annunciation, or "flag," to alert the crew of the aircraft of the given malfunction. In some cases, particularly events of high importance, instrumentation flags are provided on a primary flight display of the instrumentation system, in the form of PFD annunciations, or flags.

Associated with a given PFD annunciation is a crew checklist consisting of procedures to be carried out by the crew in response to a given PFD annunciation. Typically, however, a crew member must manually search for a corresponding crew checklist in an electronic or paper reference manual. In some more advanced settings, a corresponding checklist may be displayed in a secondary display, such as the MFD display. The inability for the crew to interact directly with a selected PFD annunciation on a primary flight display of the aircraft leads to unnecessary messages on the EICAS system. This creates increased workload and inefficiency for the flight crew. Therefore, it would be advantageous to provide a method and system that remedies the deficiencies of the prior art.

SUMMARY

A system for providing dynamic primary flight display (PFD) flags of a display device is disclosed. In one aspect, the system may include, but is not limited to, a display device, wherein the display device includes a primary flight display area user interface device; and one or more processors, a non-transitory computer-readable storage medium containing instructions configured to cause the one or more processors to: receive at least one instrumentation parameter from a sub-system of the aircraft; display one or more primary flight display annunciations in the primary flight display area of the display device in response to receiving at least one instrumentation parameter; receive one or more signals from the user interface device indicative of a user selection of the displayed one or more primary flight display annunciations; retrieve one or more checklists corresponding to the one or more primary flight display annunciations; and display the one or more checklists corresponding to the one or more primary flight display annunciations in response to the received signal indicative of a user selection of the one or more primary flight display annunciations.

In a further aspect, the system for providing dynamic primary flight display (PFD) flags may include, but is not limited to, a touchscreen display device, wherein the touchscreen display device includes a primary flight display area; and one or more processors, a non-transitory computer-readable storage medium containing instructions configured to cause the one or more processors to: receive at least one instrumentation parameter; display one or more primary flight display annunciations in the primary flight display area of the touchscreen enabled display device in response to the received at least one instrumentation parameter; detect one or more user selection gestures on the one or more primary flight display annunciations; retrieve one or more checklists corresponding to the one or more primary flight display annunciations; and display the one or more checklists corresponding to the one or more primary flight display annunciations in response to the detection of one or more user selection gestures.

A method for providing dynamic primary flight display (PFD) flags is disclosed. In one aspect, the system may include, but is not limited to, providing a display device, wherein the display device includes at least one display area, the display device being responsive to one or more user interface devices; receiving at least one instrumentation parameter; displaying a primary flight display annunciation in the primary flight display area of the display device in response to the received instrumentation parameter; receiving a user selection of the primary flight display annunciation from a user interface device; retrieving a checklist corresponding to the primary flight display annunciation from a memory; and displaying the retrieved checklist corresponding to the primary flight display annunciation.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the disclosure may be better understood by those skilled in the art by reference to the accompanying figures in which.

DETAILED DESCRIPTION OF THE INVENTION

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention. Reference will now be made in detail to the subject matter disclosed, which is illustrated in the accompanying drawings.

Referring generally to FIG. 1A through 4, a system 100 for providing dynamic primary flight display annunciations is described in accordance with the present disclosure. The present invention is directed toward a method and system suitable for providing user-selectable primary flight display (PFD) annunciations, or "flags," which when selected display the checklist corresponding to the selected PFD flag on a chosen display device. The present invention allows for more efficient and intuitive checklist access to a crew member utilizing the primary flight display of an aircraft.

Figure 1A:
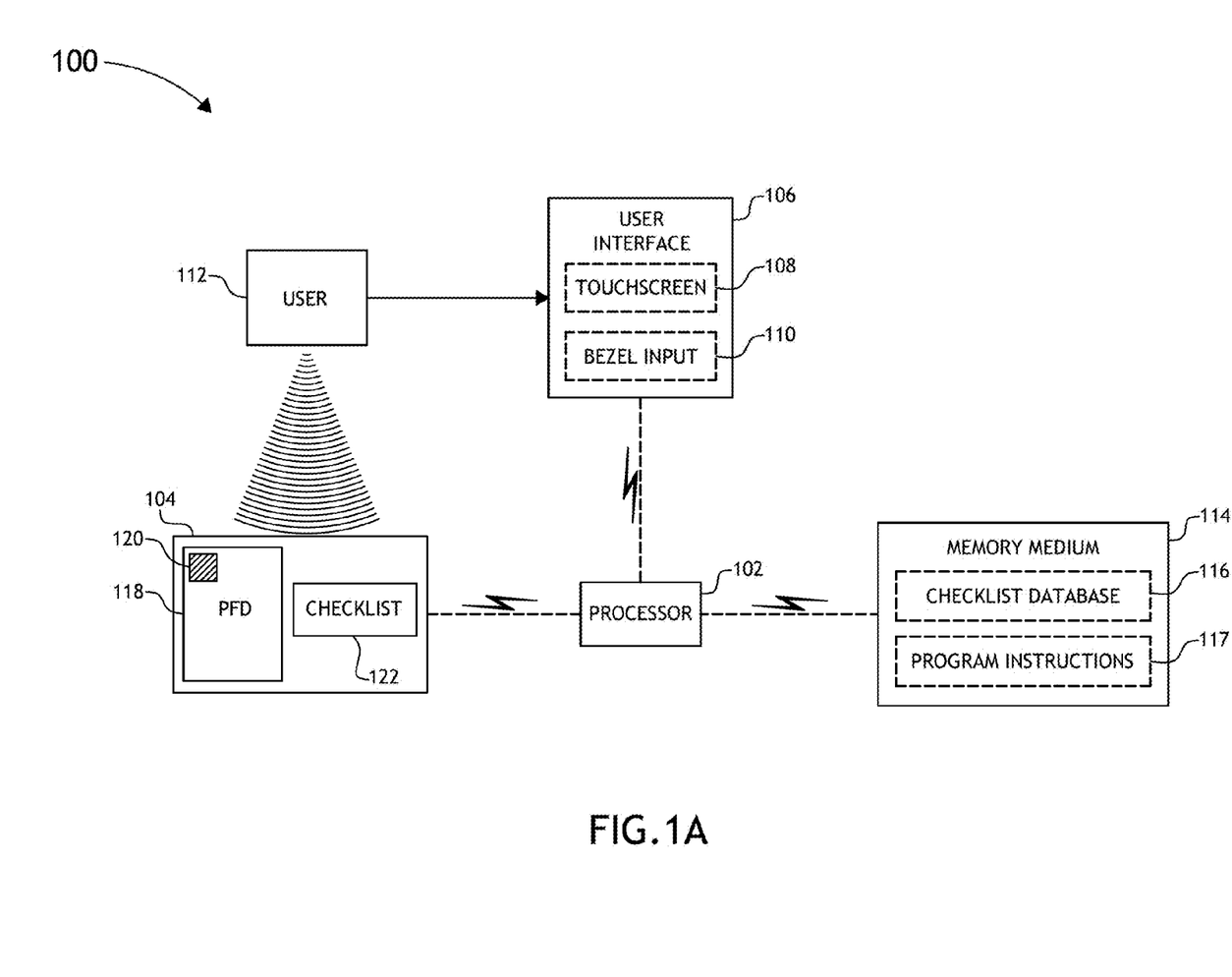
FIG. 1A is a block diagram view of a system for providing dynamic primary flight display (PFD) flags, comprising, in accordance with one embodiment of the present invention.

FIG. 1A illustrates a block diagram view of the system 100 for providing dynamic primary flight display annunciations, in accordance with one embodiment of the present invention. The system 100 may include a processor 102, a display device 104 communicatively coupled to the computer processor 102, and a user interface 106 (e.g., touchscreen interface 108, bezel mounted interface 110, keyboard, mouse, trackpad, trackball, joystick, toggle switch or the like) communicatively coupled to the processor 102. The processor 102 is configured to display one or more primary flight display flags 120 on a PFD 118 of the display device 104 in response to a received instrumentation indication (e.g., sensor failure indication, loss of sensor signal indication, miscompare indication, or processor failure indication). Responsive to the received instrumentation indication, the processor 102 may display a corresponding dynamic PFD flag 120 on the PFD 118 of display device 104. The processor 102 may further be configured to receive a signal from a user interface device 106 indicative of a user selection of the displayed PFD flag 120. In response to the selection of a given PFD flag 120, the processor 102 may retrieve a corresponding crew checklist from a checklist database 116 (e.g., checklist stored in memory 114) and then display the corresponding checklist on a display device (e.g., display device 104 or an additional display device (not shown)).

The display device 104 may include any display device known in the art. In one embodiment, the display device 104 may include, but is not limited to, a liquid crystal display (LCD). In another embodiment, the display device 104 may include, but is not limited to, an organic light-emitting diode (OLED) based display. In an additional embodiment, the display device may include a heads up display device integrated into a cockpit of an aircraft. Those skilled in the art should recognize that a variety of display devices may be suitable for implementation in the present invention and the particular choice of display device may depend on a variety of factors, including, but not limited to, form factor, cost, power demands, and the like. In a general sense, any display device capable of integrating a user interface device (e.g., touchscreen, bezel mounted interface, keyboard, mouse, trackpad, and the like) is suitable for implementation in the present invention.

The user interface 106 may include any user interface known in the art. In one embodiment, the user interface may include, but is not limited to, a touchscreen interface 108. Those skilled in the art should recognize that a large number of touchscreen interface devices may be suitable for implementation in the present invention. For instance, the display device 104 may be equipped with a touchscreen interface 108, such as, but not limited to, a capacitive touchscreen, a resistive touchscreen, a surface acoustic based touchscreen, an infrared based touchscreen, or the like. In a general sense, any touchscreen interface capable of integration with the display portion of the display device 104 is suitable for implementation in the present invention. In another embodiment, the user interface 106 may include, but is not limited to, a bezel mounted interface 110. For example, the display device 104 may include a bezel equipped with one or more bezel mounted interfaces 110. For instance, the bezel mounted interface 110 may include, but is not limited to, a hard key (or hard "button") disposed on the bezel of the display device 104. In a general sense, any bezel mounted interface capable of integration with the display device 104 is suitable for implementation in the present invention. Further, it should be recognized that a wide variety of user interface devices may be suitable for implementation in the present invention. For example, in addition to a touchscreen interface 108 or a bezel interface 110, the user interface 106 may include, but is not limited to, a lever, a knob, a scroll wheel, a track ball, a switch, a dial, a sliding bar, a scroll bar, a slide, a handle, a touch pad, a paddle, a steering wheel, a keyboard, a keypad, a joystick, or the like.

In another aspect, the one or more processors 102 are in communication with a memory medium 116. The memory medium 114 may be configured to store a set of checklists in a checklist database 116. The checklist database 116 may include any one of the known checklists that may be associated with known PFD flags. In addition, the one or more memory media 114 may store the program instructions suitable for execution by the communicatively coupled one or more processors 102. Program instructions 117 implementing methods such as those described herein may be transmitted over or stored on a carrier medium. The carrier medium may be a transmission medium such as a wire, cable, or wireless transmission link. The carrier medium may also include a memory medium 116 such as a read-only memory, a random access memory, a magnetic or optical disk, or a magnetic tape.

In general, the term "processor" may be broadly defined to encompass any device having one or more processors, which execute instructions from a memory medium. In this sense, the one or more processors 102 may include any microprocessor-type device configured to execute software algorithms and/or instructions. In one embodiment, the one or more processors 102 may include an onboard aircraft computer or other computer system (e.g., processor, memory, bus, I/O, and the like) configured to execute a program configured to operate the system 100, as described throughout the present disclosure. It should be recognized that the steps described throughout the present disclosure may be carried out by a single computer system or, alternatively, a multiple computer systems. Moreover, different subsystems of the system 100, such as the display device 104 or the user interface device 106, may include a processor or logic elements suitable for carrying out at least a portion of the steps described above. Therefore, the above description should not be interpreted as a limitation on the present invention but merely an illustration.

Figure 1B:
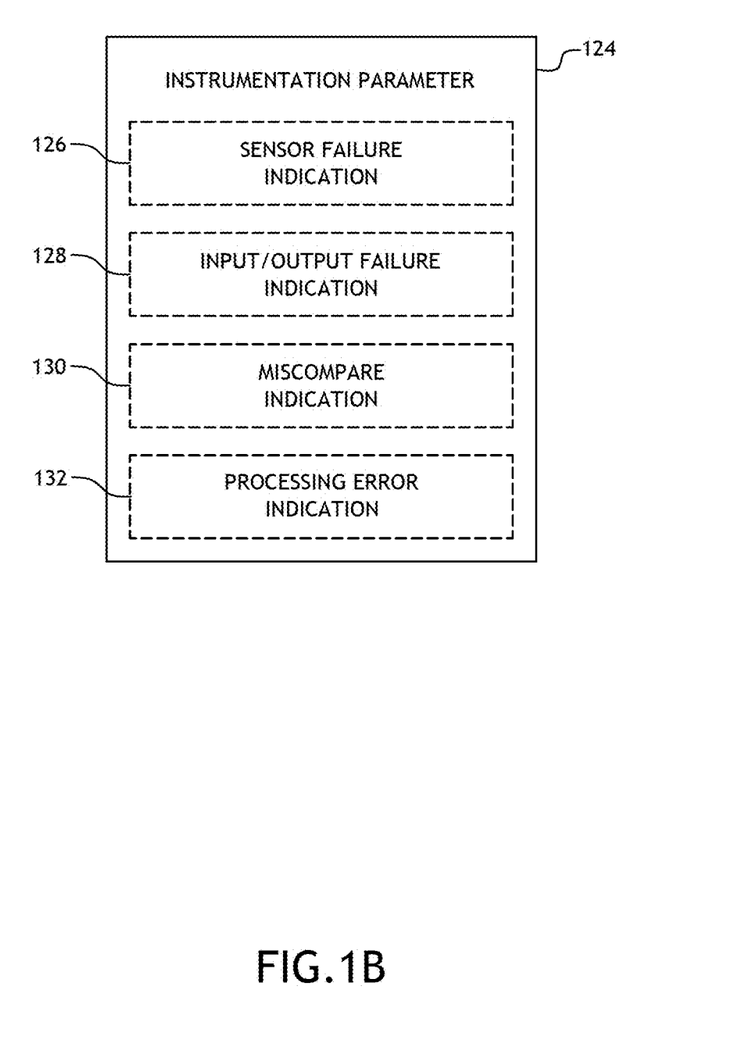
FIG. 1B is a block diagram depicting various types of instrumentation parameters, in accordance with one embodiment of the present invention.

In one aspect of the present invention, the processor 102 of the system 100 may be configured to receive an instrumentation parameter. As shown in FIG. 1B, the instrumentation parameter 124 may include, but is not limited to, a sensor failure indication 126, an input/output failure indication 128, a miscompare indication 130, a processing error indication 132, or the like.

In one embodiment, the processor 102 may be configured to receive a sensor failure indication 126 from one or more sensor systems (e.g., air data system or attitude heading system) of the aircraft. For example, the processor 102 may receive a sensor failure indication from an air data computer (ADC) of an air data system (ADS). Typically, an ADS may include various sensors for measuring parameters associated with the operation of the aircraft (e.g., temperature, pressure, and the like) and an air data computer (ADC) configured to calculate one or more various flight parameters (e.g., indicated airspeed) using the measured parameters. In the event of failure of any sensor utilized to calculate any one of the various air data parameters, the ADC may transmit a signal to the processor 102 indicative of the failure of the given sensor and/or the inability of the ADC to compute the given flight parameter(s). In addition, in the event of a malfunction of an ADC used to calculate any one of the various flight parameters, the ADC may transmit a signal to the processor 102 indicative of the failure of the given ADC. Those skilled in the art should recognize that an ADC may be utilized to calculate numerous air data parameters, such as, but not limited to, indicated airspeed, true airspeed, vertical speed, static air temperature, total air temperature, pressure altitude, barometric corrected altitude, barometric pressure, total pressure, and static pressure and the like. It should further be recognized that the sensors utilized to feed data into an ADC in an ADS may include, but are not limited to, thermal sensors (e.g., analog temperature sensor) and pressure sensors (e.g., analog pressure sensors. It is further recognized herein that the processor 102 may be configured to receive multiple sensor failure indications from multiple air data systems and/or air data computers of each of the multiple air data systems.

By way of another example, the processor 102 may receive a sensor failure indication from an attitude heading computer of an attitude heading system. A typical attitude heading system (AHS) may include an attitude heading computer, one or more electronic compensation units (ECUs), and a flux detector unit (FDU). In this regard, the AHC may utilize measurements from gyro and accelerometer sensor signals to obtain three-axis angle, rate, and acceleration information. Further, each AHC may receive true airspeed from its corresponding ADS, magnetic flux sensor signals from the corresponding FDU, compass compensation from the ECU, and various other sensor signals. Utilizing this information the AHC of the AHS may provide attitude, stabilized magnetic heading, and linear acceleration to the processor 102. In the event of failure of any sensor utilized to calculate any one of the various AHS provided parameters, the AHC may transmit a signal to the processor 102 indicative of the failure of the given sensor and/or the inability of the AHC to compute the given parameter(s). In addition, in the event of a malfunction of an AHC used to calculate any one of the various AHS parameters, the AHC may transmit a signal to the processor 102 indicative of the failure of the given AHC.

In another example, the processor 102 may receive a sensor failure indication from an engine indication system (EIS). The one or more engine indication systems of the aircraft may include multiple turbine speed sensors and intermediate compressor turbine speed sensors. Additional sensors may include engine oil temperature sensors and oil pressure sensors. In the event of failure of any EIS sensor, the EIS may transmit a signal to the processor 102 indicative of the failure of the given sensor and/or the inability of the EIS to compute the given parameter(s).

Those skilled in the art should recognize that the above listing of sensor systems is illustrative only and should not be interpreted as limiting. It is noted herein that the one or more processors 102 of the system 100 may be configured to receive a signal indicative of failure from any aircraft sensor system known in the art.

In another embodiment, the one or more processors 102 of the system 100 may be configured to receive an input/output failure indication 128 from one or more sensor systems of the aircraft. In a general sense, an input/output failure may include any malfunction associated with a loss of signal from one or more sensors of a given sensor system. In the event one or more sensors experiences an input/output failure the data computer associated with the sensor system (e.g., ADS or AHS) may transmit a signal indicative of the input/output failure of the sensor to the processor 102 of the system 100.

In another embodiment, the one or more processors 102 of the system 100 may be configured to receive a miscompare indication 130 from a comparator module. The comparator module (not shown) may consist of an algorithm or programmed instructions executable by the one or more processors 102 or an additional processor in communication with the one or more processors 102. The comparator module may be configured to detect differences exceeding a predetermined threshold between an output of a first sensor system displayed on a pilot PFD and an output of an additional sensor system (of the same type as the first sensor system) displayed on a co-pilot PFD. When a difference larger than the accepted difference is detected a miscompare warning is issued and a miscompare PFD flag for the given sensor is displayed on the PFD 118 of the display device 104. It is noted herein that any miscompare flag known in the art may be displayed on the primary flight display 118 of system 100. Miscompare flags are discussed in detail in U.S. Pat. No. 6,285,298 by Gordan, issued on Sep. 4, 2001, and is incorporated herein in the entirety.

In another embodiment, the one or more processors 102 of the system 100 may be configured to receive a processing error indication 132 from an additional processor (not shown). For example, the one or more processors 102 of the system 100 may be configured to receive a processing error indication from a 3D graphics processor of the aircraft. Such an error may lead to a failure in the simulated vision system (SVS) of the aircraft, which may be indicated by a SVS fail message on the primary flight display by the one or more processors 102.

Figure 2A:
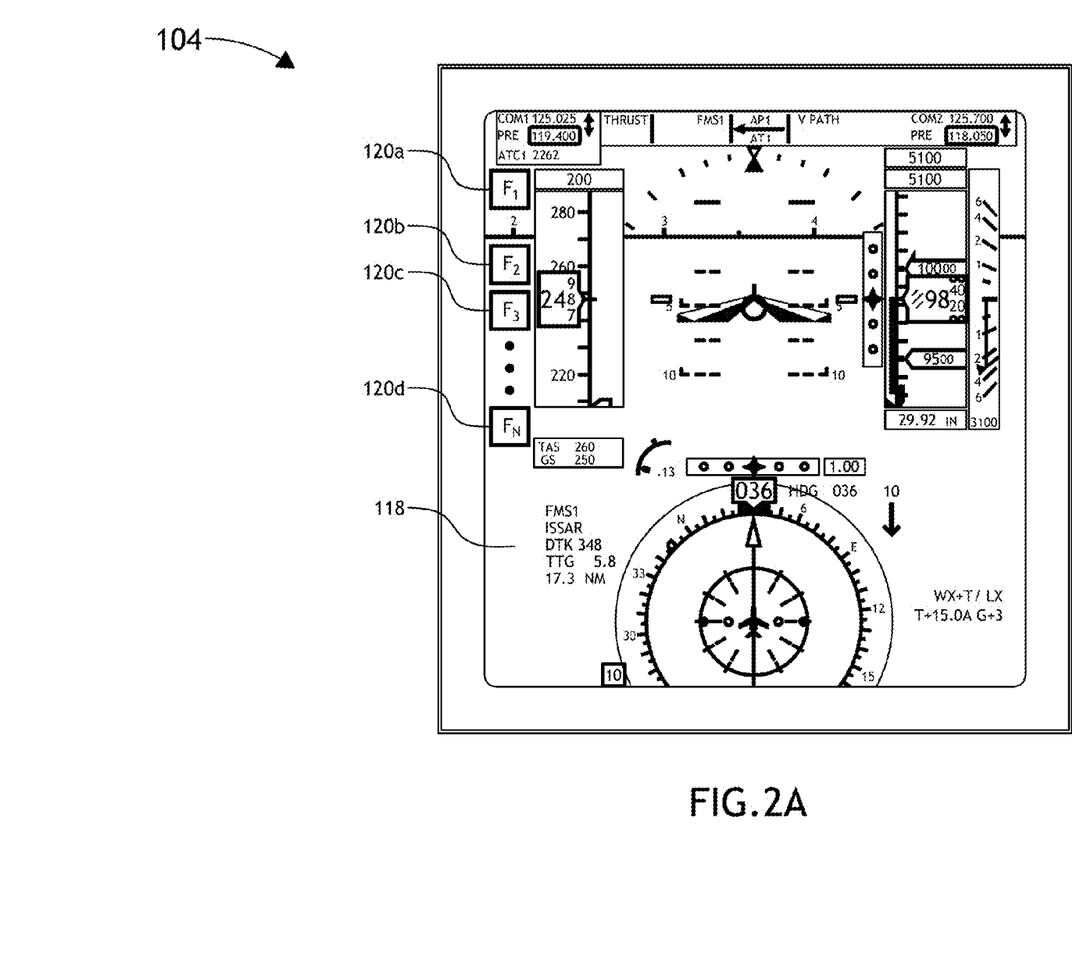
FIG. 2A is a graphical view of a primary flight display, in accordance with one embodiment of the present invention.

FIG. 2A illustrates one or more primary flight display annunciations, or flags, displayed or "launched" on a primary flight display 118 of display device 104 via the one or more processors 102 of system 100. FIG. 2A illustrates multiple PFD flags 120a . . . 120d displayed on the primary flight display 118 of the display device 104. In this regard, the processor 102 may display a PFD flag—$F_1$ 120a in a first portion of the primary flight display in response to a first instrumentation indication received by the processor 102, a PFD flag—$F_2$ 120b in a second portion of the primary flight display in response to a second instrumentation indication received by the processor 102, a PFD flag—$F_3$ 120c in a third portion of the primary flight display in response to a third instrumentation indication received by the processor 102, and up to and including a PFD flag—$F_N$ 120d in an Nth portion of the primary flight display in response to an Nth instrumentation indication received by the processor 102. It is recognized that any number of PFD flags may be displayed in the PFD area of the display device and the number depicted in FIG. 2A should not be interpreted as a limitation. It is further noted that the location of the displayed PFD flags of FIG. 2A is not limiting and is provided for illustrative purposes only. In a general sense, any number of PFD flags may be displayed at any set of positions of the primary flight display 118 of the display device 104.

In another aspect, the PFD flags may include a visual identifier or other graphically distinguishing feature indicative of the given PFD flag 120a . . . 120d being associated with a specific instrumentation indication (e.g., sensor failure, input/output failure, miscompare indication, or processing failure). In an additional aspect, a displayed PFD flag (e.g., 120a . . . 120d) may include a visual identifier or other graphically distinguishing feature indicating that there is additional checklist data associated with the displayed PFD flag.

Figure 2B:
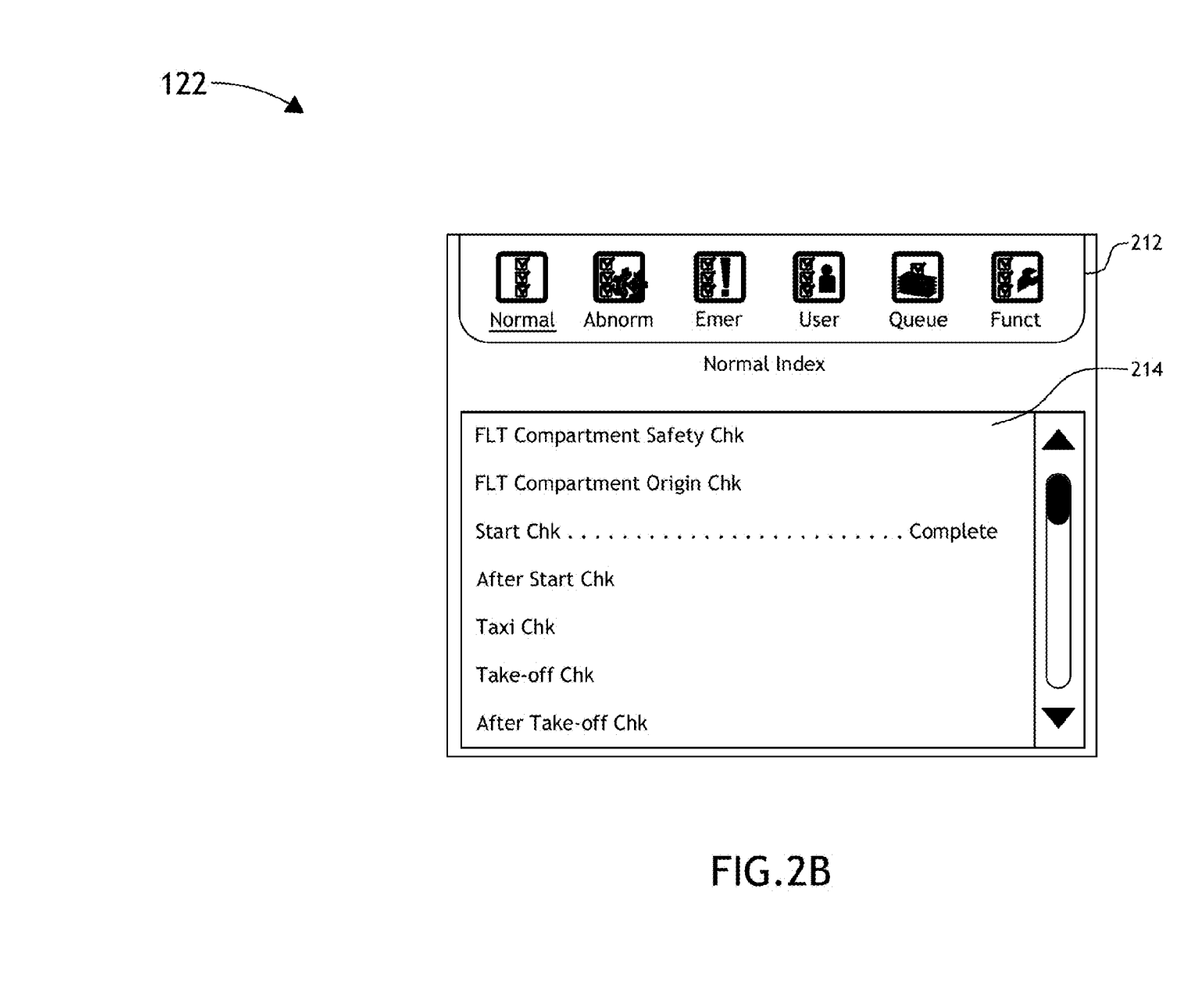
FIG. 2B is a graphical view of a checklist corresponding with a selected primary flight display, in accordance with one embodiment of the present invention.

The one or more processors 102 of the system 100 may be configured to receive an input signal from a user interface device 106 indicative of a user 112 selection of the display PFD flag 120. Then, in response to the received user selection, the processor 102 may retrieve the one or more corresponding checklists from a checklist database 116 stored in a memory medium 114 (e.g., read-only memory, random access memory, solid state memory, magnetic memory, optical disk, magnetic tape or the like) and display the one or more corresponding checklists, as shown in FIG. 2B. In a further aspect, the processor 102 of the system 100 may display the one or more checklists in a display area of a display device (e.g., display device 104, an additional display device, a heads up display, or the like).

Referring again to FIG. 1A, the processor 102 may receive information from a user 112 via the user interface device 106, such as, but not limited to, a touchscreen 108, or bezel mounted input 110. In this regard, the user 112 may transmit a signal to the one or more processors 102 indicative of a user inputted request to display a checklist corresponding with a selected PFD flag (e.g., 120a . . . 120d). After receiving this request, the one or more processors 102 may launch a checklist corresponding with the selected PFD flag in a display area of a display device.

In a further embodiment, the PFD flag 120 displayed in the PFD display 118 may consist of a "soft key" configured to receive a user input and subsequently provide a checklist launch request signal to the processor 102. Those skilled in the art should recognize that user feedback may be inputted using a soft key (e.g., 120a . . . 120d) in a variety of ways. For example, the processor 102 may be configured to launch a checklist associated with a given PFD flag in response to the pressing, pressing and holding (e.g., holding for a selected length of time), or tapping (e.g., single tap, double tap, and the like) of a soft key enabled PFD flag (e.g., 120a . . . 120d) by a user 112.

In another embodiment, a bezel mounted "hard" key (not shown), or button, may be associated with a given PFD flag 120 displayed in the PFD display 118. The bezel mounted key may be configured to receive a user input and subsequently provide a checklist launch request signal to the processor 102. For example, the user 112 may press or press and hold a bezel mounted key in order to initiate the checklist corresponding to the PFD flag associated with the pressed bezel mounted key. For instance, one or more buttons, or keys, may be disposed along the bezel of a display device 104 such that each of the one or more PFD flags (e.g., 120a . . . 120d) are displayed proximate to a bezel mounted key. Pressing or pressing and holding a bezel mounted key, in turn, may launch the checklist corresponding with the PFD flag located adjacent to the pressed bezel mounted key. Those skilled in the art should recognize that user feedback may be inputted using the hard key in a variety of ways. For example, the processor 102 may be configured to launch the checklist in response to a single press of the hard key. Additional feedback mechanisms may include, but are not limited to, a multiple hard key press, and a press and hold (e.g., hold for a selected amount of time) of the hard key. In other embodiments, the user interface device may include, but is not limited to, a trackpad, a mouse, a keyboard, a trackball or the like.

In another embodiment, a PFD flag checklist may be launched utilizing a drag and drop function. In this regard, a PFD flag (e.g., 120a . . . 120d) may be selected by "dragging" the PFD flag icon to a portion of a display area of a display device and "dropping" the PFD flag icon in that area. It should be recognized by those skilled in the art that the process of dragging and dropping the graphical representation of a particular PFD flag (e.g., 120a . . . 120d) from the primary flight display 118 to a display area of a display device signals the processor 102 to launch a checklist (e.g., checklist retrieved from memory 114) associated with the selected PFD in a particular display area of at least one of the display devices (e.g., display device 104, an additional display device, or a heads up display) of the system 100. In this regard, the one or more processors 102 are configured to launch the corresponding PFD flag checklist at the location of the display device in which the PFD flag is "dropped."

FIG. 2B illustrates an exemplary PFD crew checklist 122 associated with a PFD flag 120 displayed by the one or more processors 102 of the system 100. The crew checklist may consist of any crew checklist configuration known in the art. A typical crew checklist may include a set of procedures used to address the situation giving rise to the associated PFD flag 120. In general, the crew checklist 122 displayed in response to a selected PFD flag 120 is provided in the form of a predefined checklist. Each checklist associated with each type of PFD flag 120 may be stored in a storage medium 114 communicatively coupled to the one or more processors 102 of the system 100. The checklist window illustrated in FIG. 2B depicts a set of index keys 212, which when pressed list a sub-list associated with the given index. For example, the indices associated with the given checklist may include, but are not limited to, a normal index, an abnormal index, and emergency index, a user index, a queue index, and a function index. Any one of the index keys may be selected by the user (e.g., selected via the user interface device), and the one or more processors 102 may act to auto list the predefined procedures stored for the given index. In a further embodiment, the checklist 122 may include a scroll element utilized to "scroll" through the checklist information displayed within the checklist window. It is noted herein that the checklist and the depicted checklist indices of FIG. 2B are not limiting and should be interpreted merely as illustrative. It is noted the present invention extends to any checklist format or layout suitable for displaying the checklist information on an electronic display device. In a further embodiment, the one or more processors 102 of the system 100 may further be configured to display multiple checklists simultaneously. For example, a user 112 may select multiple PFD flags (e.g., 122*a* . . . 122*d*) and the processor 102 may, in turn, launch each of the checklists associated with the selected multiple PFD flags. In a further aspect, the checklist 122 may include selectable fields that are linked to additional information stored in the checklist data base 116, and which may be retrieved utilizing the one or more processors 102 of the system 100 in response to a user selection (e.g., via the user interface 106) of a particular field of the checklist 122.

Figure 2C:
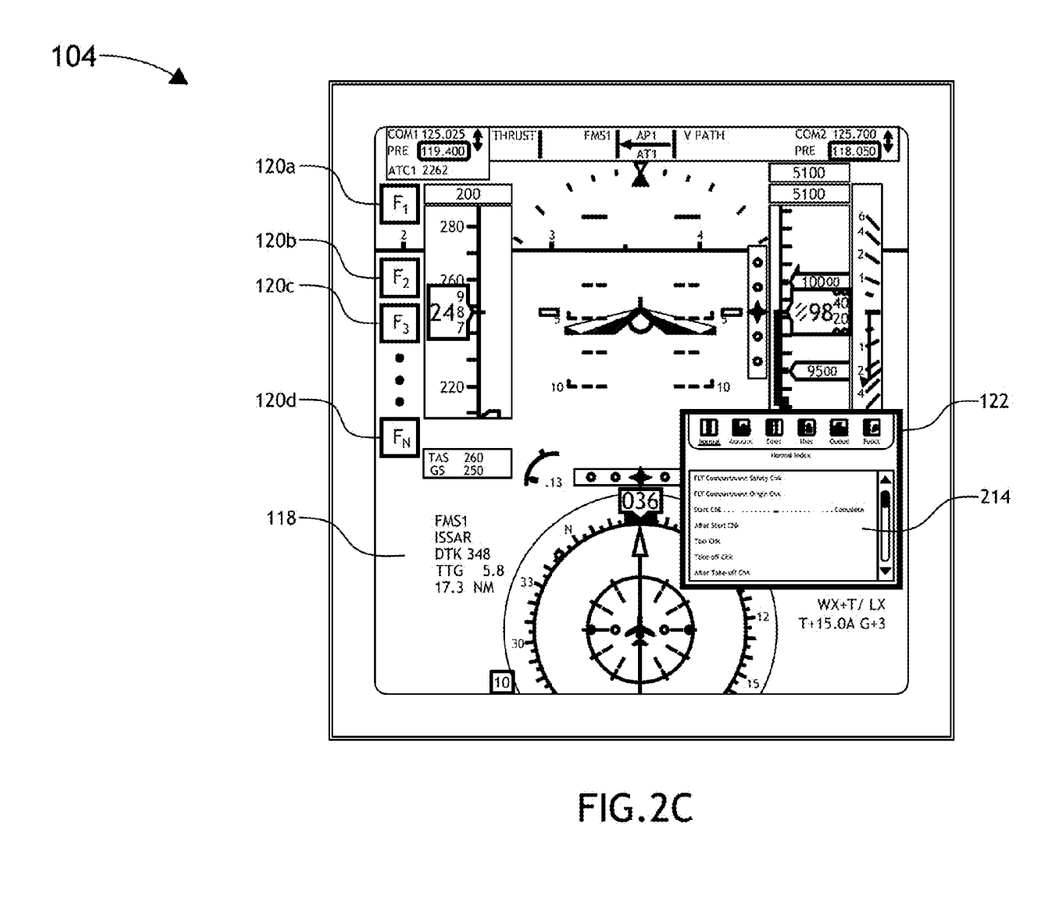
FIG. 2C is a graphical view of a primary flight display and a checklist displayed thereon, in accordance with one embodiment of the present invention.

FIG. 2C illustrates a PFD flag checklist 122 displayed within the primary flight display area 118 of the display device 104 of the system 100, in accordance with one embodiment of the present invention. In this regard, the one or more processors 102 of the system 100 may be configured to display the checklist 122 in an area of the primary flight display 118 of the display device 104. In one embodiment, the location of the checklist 122 may be predefined. In another embodiment, the location of the checklist 122 may be user selected (e.g., user selected using user interface device 106). In this regard, the system 100 may provide flexibility to the user 122, allowing the user 112 to launch the checklist 122 in an area of the primary flight display 118 that is deemed non-critical by the user 112 at the time the checklist is launched.

Figure 2D:
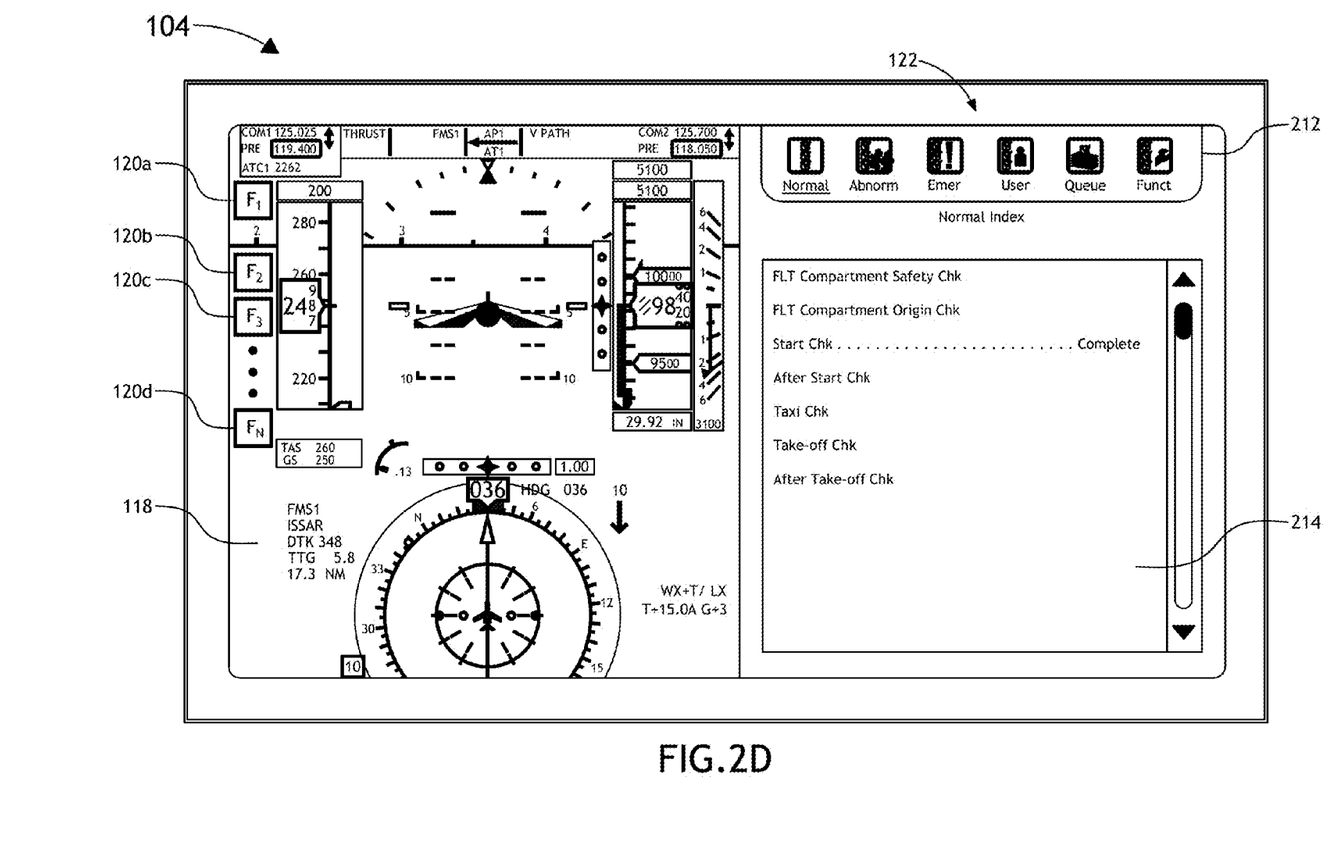
FIG. 2D is a graphical view of a split panel display device including a primary flight display, in accordance with one embodiment of the present invention.

FIG. 2D illustrates a PFD flag checklist 122 displayed in an additional pane of the display device 104, in accordance with one embodiment of the present invention. In this regard, the one or more processors 102 of the system 100 may be configured to display the checklist 122 in an additional pane, or window, displayed on the display device 104. For example, as shown in the FIG. 2D, a first pane (left side) may include the primary flight display 118, while a second pane (right side) of the display area of the display device 104 may display the checklist 122. It is further noted that the processor 102 may be configured to automatically resize the primary flight display from a full screen format to a partial screen format (e.g., a single pane) when a checklist 122 is launched, allowing the checklist 122 to automatically be displayed in the second pane alongside the primary flight display 118. Moreover, the one or more processors 102 of the system 100 may further be configured to revert the primary flight display 118 back to a full size format once the checklist 122 is closed. In a further embodiment, in the case of multiple checklists (not shown), the one or more processors 102 may be configured to display each of the checklists in a separate pane of the display area of the display device 104.

Figure 2E:
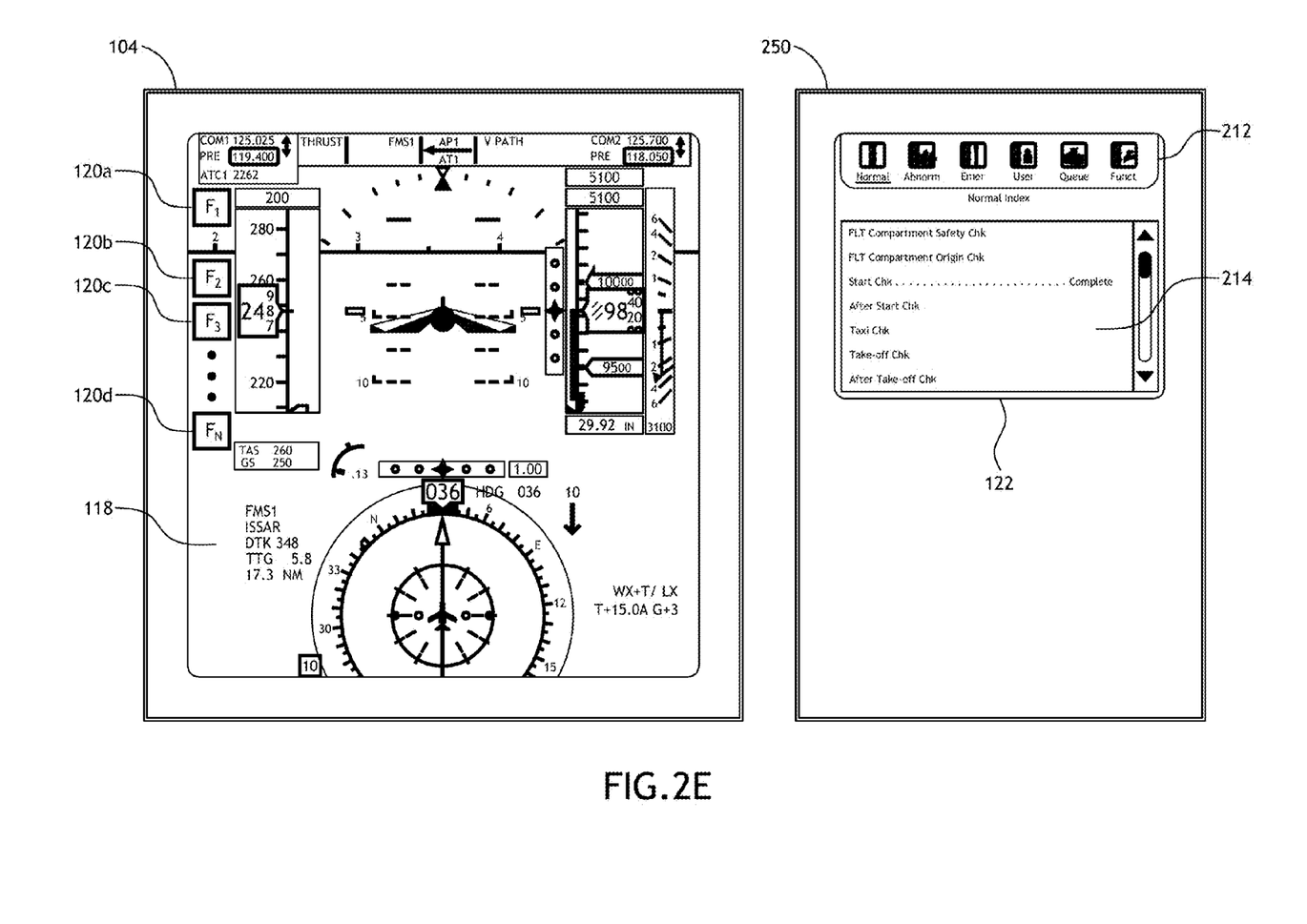
FIG. 2E is a graphical view of a pair of display devices with a first display device including a primary flight display and the second display device including a checklist associated with a selected primary flight display annunciation, in accordance with one embodiment of the present invention.

FIG. 2E illustrates a PFD checklist 122 displayed on an additional display device 250, in accordance with one embodiment of the present invention. In this regard, the one or more processors 102 of the system 100 may be configured to display the checklist 122 on an additional display device 250. For example, as shown in the FIG. 2E, the first display device 104 may include the primary flight display 118, while the checklist 122 is displayed on a second display device 250. In a further embodiment, the additional display device may include an additional primary flight display. In this regard, the display device 104 may include the pilot PFD, while the additional display device may include the co-pilot PFD. In another embodiment, the additional display device 250 may include a multi-function display (MFD) device of the aircraft. In another embodiment, the additional display device 250 may include a heads up display device of the aircraft. In another embodiment, the additional display device 250 may include a portable display device, such as, but not limited to, an electronic flight bag (EFB), a portable computing device (e.g., laptop or tablet computing device), or the like. The portable computing device may be communicatively coupled to the processor 102 in any manner known in the art, such as, but not limited to, a wireless connection (e.g., BLUETOOTH, WiFi, and the like) or a wireline connection. It is noted herein that the additional display device 250 may consist of any aircraft cockpit display known in the art.

Figure 3:
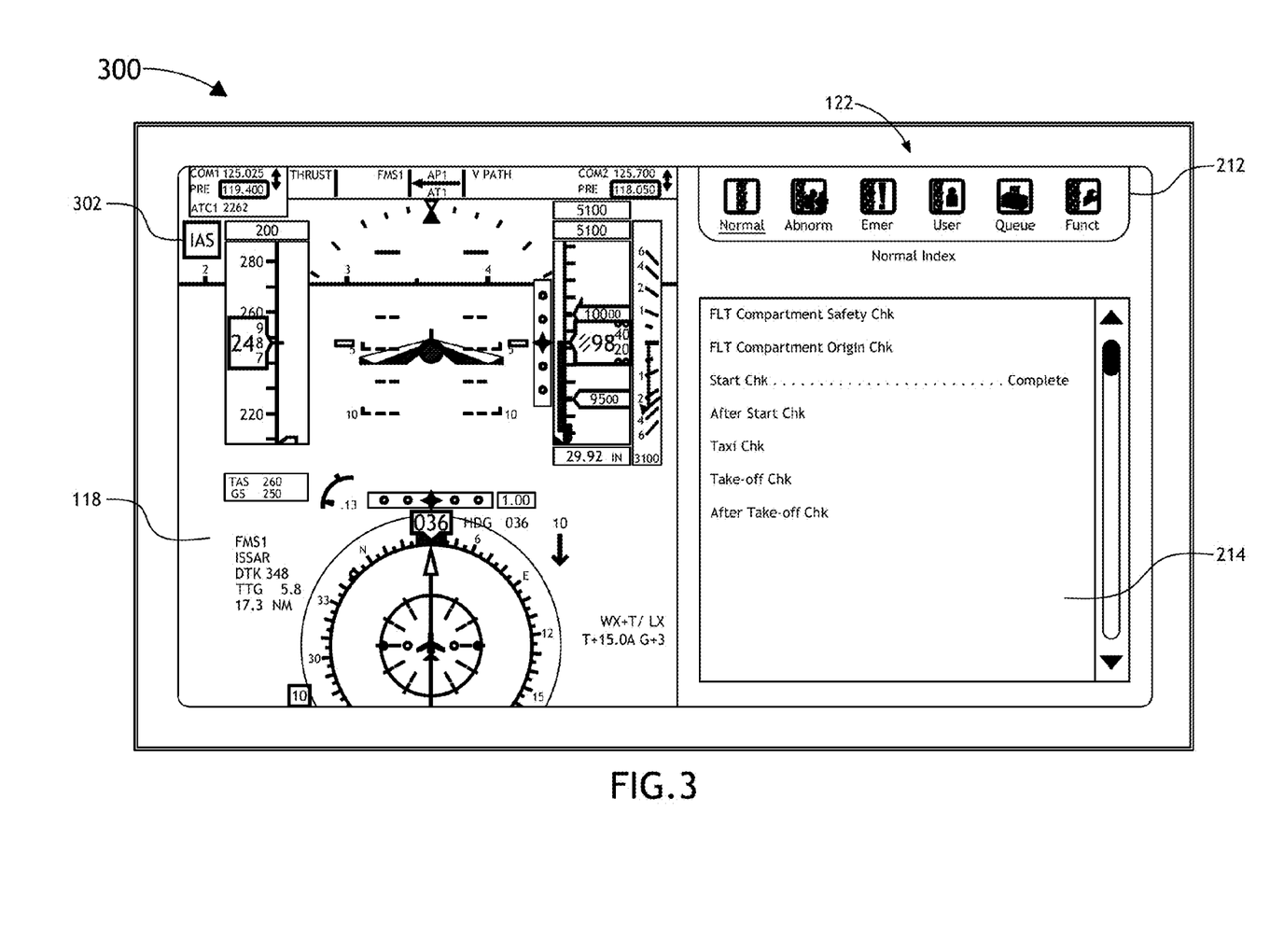
FIG. 3 is a graphical view of a primary flight display, in accordance with an exemplary embodiment of the present invention.

FIG. 3 illustrates an exemplary embodiment of a display device 300 of the system 100 suitable for providing dynamic primary flight display annunciations. As shown in FIG. 3, a primary flight display 118 may be displayed in a first pane (left pane) of the display device 300 (e.g., touchscreen LCD display device), while a checklist 122 associated with a selected PFD annunciation 302 may be displayed in a second pane of the device 300. As shown in FIG. 3, an indicated air speed (IAS) PFD flag 302 may be displayed in a portion of the primary flight display 118. In this regard, one or more processors 102 of the system 100 may receive an instrumentation parameter indicating that there is a malfunction associated with the IAS reading, referred to herein as a "IAS failure indication." For example, the air data computer of an air data system may transmit a signal to the one or more processors 102 indicative of a malfunction in the air data computer's ability to calculate IAS of the aircraft (e.g., malfunction in processing capabilities of ADC or malfunction in sensors used as inputs into the ADC). Upon receiving an IAS failure indication, the one or more processors 102 may then display an IAS flag 302 on the primary flight display 118 of the display device 300. Then, a user 112 may select (e.g., touching via touchpad interface) the IAS flag 302 in order to auto-display the checklist corresponding with the IAS flag 302. In response to a user selection of the IAS flag 302, the one or more processors 302 of the system 100 may retrieve and then launch the checklist 122 associated with the IAS flag 302 in a second pane (right pane) of the display device 300. The displayed checklist 122 may include a set of checklist indices 212, such as, but not limited to, a normal index, an abnormal index, an emergency index, a user index, a queue index, and a function index). FIG. 3 depicts a checklist sub-list 214 associated with the normal index. In another embodiment, although not shown, the one or more processors 102 may launch a specific checklist appropriate for the selected PFD annunciation. In this regard, the display checklist window may consist of only the specific checklist selected for a specific PFD annunciation and need not display a selection of checklists to the user (as is depicted in FIG. 3). In a general sense, any crew checklist format known in the art is suitable for implementation in the present invention.

In a further aspect, the checklist 122 may include selectable fields that are linked to additional information stored in the checklist data base 116, and which may be retrieved utilizing the one or more processors 102 of the system 100 in response to a user selection (e.g., via the user interface 106) of a particular field of the checklist 122. Those skilled in the art should recognize that FIG. 3 is not limited to IAS flags and that any PFD flag, or annunciation, known in the art may be applied to the context described in FIG. 3.

Figure 4:
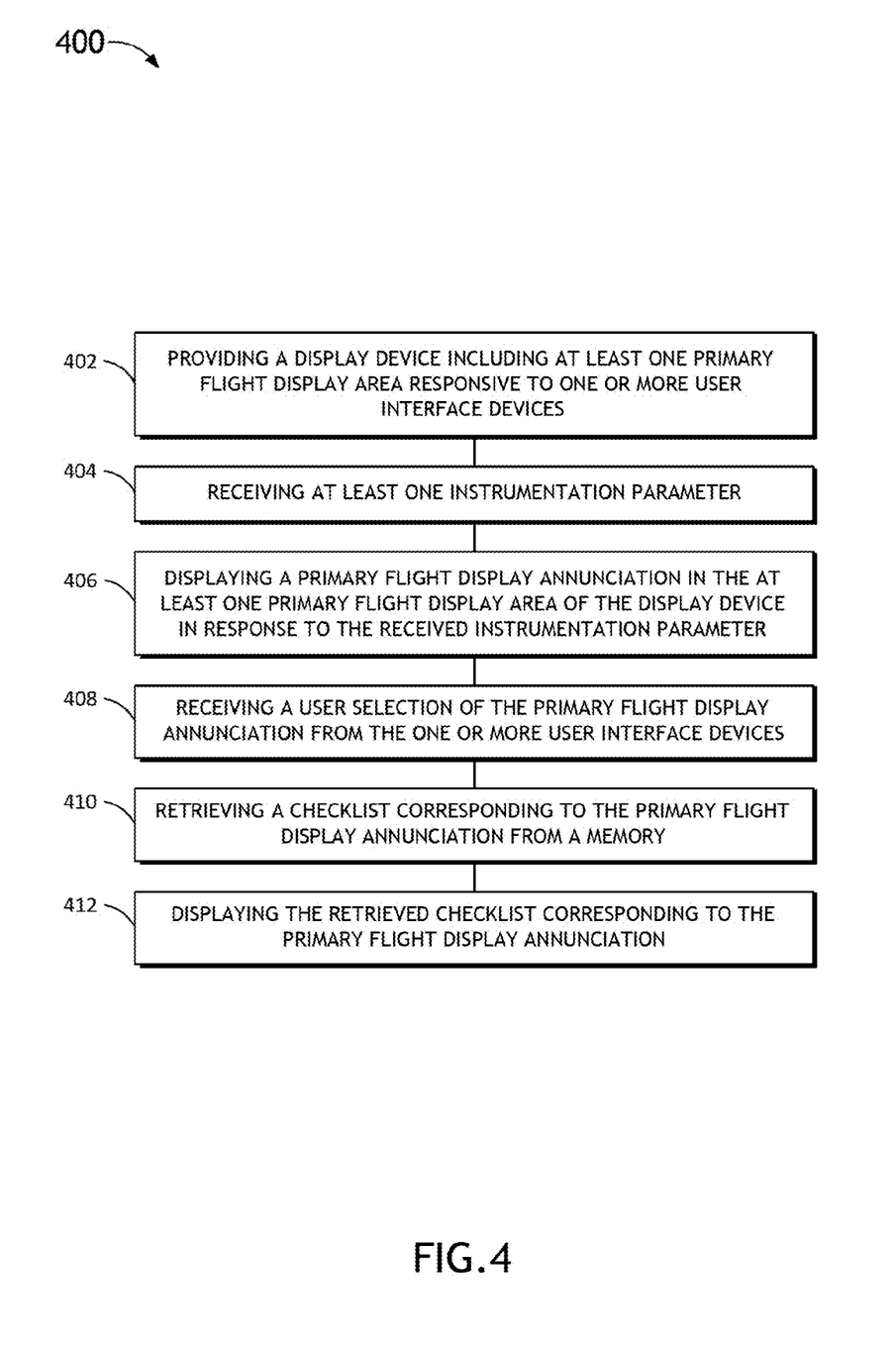
FIG. 4 is a flow chart illustrating a method for providing dynamic primary flight display (PFD) flags.

FIG. 4 illustrates a method 600 for providing dynamic primary flight display flags is described in accordance with one embodiment of the present invention. In step 402, a display device responsive to one or more user interface devices is provided. The display device may include any suitable display device known in the art, such as, but not limited to, a LCD or an OLED display. In step 404, one or more instrumentation parameters may be received. In one aspect, the one or more processors 102 of system 100 may receive one or more instrumentation parameters from one or more sub-systems of an implementing aircraft. For example, the instrumentation parameters may include, but are not limited to, a sensor failure indication from a sensor system of the aircraft, an input/output failure from a sensor system of the aircraft, miscompare indication from a comparator module of the aircraft configured to compare sensory data from two or more sensing systems, and a processing failure indication from an additional processor (e.g., graphics processor).

In step 406, a primary flight display annunciation may be displayed in the primary flight display area of the display device in response to the received sensor parameter. For example, the one or more processors 102 of system 100 may display one or more PFD flags 120a . . . 120d may be displayed in a portion of the PFD display 118. For instance, an IAS flag 302 may be displayed in a portion of the PFD display 118.

In step 408, a user selection of the primary flight display annunciation may be received from a user interface device (e.g., touchscreen interface, bezel interface, and the like). In step 410, a checklist corresponding to the selected PFD flag (e.g., 120a . . . 120d) may be retrieved from a memory. For example, the one or more processors 102 may be configured to retrieve the checklist 122 corresponding to the selected PFD flag from the memory. In step 412, the retrieved checklist corresponding to the selected primary flight display annunciation may be displayed. For example, the one or more processors 102 may be configured to display the retrieved checklist 122 on at least one display device (e.g., display device 104 or display device 250) of the system 100.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein.

Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Although particular embodiments of this invention have been illustrated, it is apparent that various modifications and embodiments of the invention may be made by those skilled in the art without departing from the scope and spirit of the foregoing disclosure. Accordingly, the scope of the invention should be limited only by the claims appended hereto.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

What is claimed is:

1. A system for providing dynamic user-selectable primary flight display (PFD) flags, comprising:
    a user interface device including a touchscreen display device, wherein the touchscreen display device includes a primary flight display area;
    one or more processors; and
    a non-transitory computer-readable storage medium containing instructions configured to cause the one or more processors to:
        receive at least one instrumentation parameter;
        display two or more dynamic user-selectable primary flight display annunciations in the primary flight display area of the touchscreen display device in response to the received at least one instrumentation parameter, the two or more dynamic user-selectable primary flight display annunciations including two or more soft keys configured to display two or more visual identifiers for indicating available checklist data associated with the two or more dynamic user-selectable primary flight display annunciations;
        receive one or more signals from the touchscreen display device indicative of a user selection of at least two of the two or more dynamic user-selectable primary flight display annunciations, wherein a user selection includes pressing one or more soft keys displaying one or more visual identifiers associated with one or more selected dynamic user-selectable primary flight display annunciations; and
        responsive to the user selection of the at least two selected dynamic user-selectable primary flight display annunciations, retrieve at least two checklists corresponding to the at least two selected dynamic user-selectable primary flight display annunciations and simultaneously display the at least two retrieved checklists corresponding to the at least two selected dynamic user-selectable primary flight display annunciations.

2. The system of claim 1, wherein the at least one instrumentation parameter received by the one or more processors comprises:
    a sensor parameter received by the one or more processors.

3. The system of claim 2, wherein the at least one sensor parameter received by the one or more processors comprises:
    a sensor failure indication from at least one sensor system of the aircraft.

4. The system of claim 3, wherein the at least one sensor parameter received by the one or more processors comprises:
    an input/output failure indication from at least one sensor system of the aircraft.

5. The system of claim 3, wherein the at least one sensor parameter received by the one or more processors comprises:
    a miscompare indication from at least one comparator module of the aircraft.

6. The system of claim 1, wherein the at least one instrumentation parameter received by the one or more processors comprises:
    at least one processing parameter received by the one or more processors.

7. The system of claim 6, wherein the at least one processing parameter received by the one or more processors comprises:
    a processing failure indication from at least one processor of the aircraft.

8. The system of claim 1, wherein the one or more processors are configured to retrieve the at least two checklists from a memory.

9. The system of claim 1, wherein the touchscreen display device comprises at least one of a liquid crystal display (LCD) device, an organic light emitting diode (OLED) display device, a light emitting diode (LED) display device, a plasma display device, or a cathode ray tube (CRT) display device.

10. The system of claim 1, wherein the one or more processors are configured to display the at least two checklists in the primary flight display area of the touchscreen display device.

11. The system of claim 1, wherein the touchscreen display device includes a first pane having a primary flight display area and at least one additional pane.

12. The system of claim 11, wherein the one or more processors are configured to display the at least one checklists in the at least one additional pane.

13. The system of claim 1, further comprising:
an additional display device.

14. The system of claim 13, wherein the at least two checklists are displayed on the additional display device.

15. The system of claim 13, wherein the additional display device comprises at least one of a multi-function display (MFD), a heads up display, an additional primary flight display (PFD), or a display device of a portable computing device.

16. A system for providing dynamic user-selectable primary flight display (PFD) flags, comprising:
a touchscreen display device, wherein the touchscreen display device includes a primary flight display area;
one or more processors; and
a non-transitory computer-readable storage medium containing instructions configured to cause the one or more processors to:
receive at least one instrumentation parameter;
display two or more dynamic user-selectable primary flight display annunciations in the primary flight display area of the touchscreen display device in response to the received at least one instrumentation parameter, the two one or more dynamic user-selectable primary flight display annunciations including two or more soft keys configured to display two or more visual identifiers for indicating available checklist data associated with the two or more dynamic user-selectable primary flight display annunciations;
detect one or more user selection gestures on the two or more dynamic user-selectable primary flight display annunciations indicative of a user selection of at least one of the two or more dynamic user-selectable primary flight display annunciations, wherein a user selection includes pressing one or more soft keys displaying one or more visual identifiers associated with one or more selected dynamic user-selectable primary flight display annunciations;
responsive to a user selection of the one or more selected dynamic user-selectable primary flight display annunciations, retrieve one or more checklists corresponding to the one or more selected dynamic user-selectable primary flight display annunciations and display the one or more retrieved checklists corresponding to the one or more selected dynamic user-selectable primary flight display annunciations, wherein one or more checklist steps of the one or more displayed checklists comprise one or more user-selectable fields, wherein the one or more user-selectable fields include one or more soft keys configured to display one or more visual identifiers for indicating additional information associated with the one or more user-selectable fields;
detect one or more user selection gestures on the one or more user-selectable fields indicative of a user selection of at least one of the one or more user-selectable fields, wherein a user selection of the at least one of the one or more user-selectable fields includes pressing one or more soft keys displaying one or more visual identifiers associated with the at least one of the one or more user-selectable fields; and
responsive to the user selection of the at least one selected user-selectable field, display the additional information associated with the at least one selected user-selectable field simultaneously with the one or more displayed checklists.

17. A system for providing dynamic user-selectable primary flight display (PFD) flags, comprising:
a display device, wherein the display device includes a primary flight display area configured to display two or more dynamic user-selectable primary flight display annunciations, the two or more dynamic user-selectable primary flight display annunciations including two or more soft keys configured to display two or more visual identifiers for indicating available checklist data associated with the two or more dynamic user-selectable primary flight display annunciations; and
a user interface device configured to transmit one or more signals indicative of a user selection of at least two of the displayed two or more dynamic user-selectable primary flight display annunciations to the display device, a user selection including pressing one or more soft keys displaying one or more visual identifiers associated with the two or more selected dynamic user-selectable primary flight display annunciations, the display device further configured to simultaneously display at least two checklists in response to the one or more signals from the user interface device indicative of a user selection of at least two of the two or more dynamic user-selectable primary flight display annunciations.

18. A method for providing dynamic user-selectable primary flight display (PFD) flags, comprising:
providing a touchscreen display device including a primary flight display area;
receiving at least one instrumentation parameter;
displaying two or more dynamic user-selectable primary flight display annunciations in the primary flight display area of the touchscreen display device in response to the at least one received instrumentation parameter, the two or more dynamic user-selectable primary flight display annunciations including two or more soft keys configured to display two or more visual identifiers for indicating available checklist data associated with the two or more dynamic user-selectable primary flight display annunciations;
receiving a user selection of at least one of the two or more dynamic user-selectable primary flight display annunciations via a touchscreen of the touchscreen display device, wherein a user selection includes pressing one or more soft keys displaying one or more visual identifiers associated with one or more selected dynamic user-selectable primary flight display annunciations;
retrieving one or more checklists corresponding to the one or more selected primary flight display annunciations from a memory;
displaying the retrieved one or more checklists corresponding to the at least one selected primary flight display annunciation, wherein one or more checklist steps of the one or more displayed checklists comprise one or more user-selectable fields, wherein the one or more user-selectable fields include one or more soft keys configured to display one or more visual identifiers for indicating additional information associated with the one or more user-selectable fields;
receiving a user selection of at least one of the one or more user-selectable fields, wherein a user selection of the at least one of the one or more user-selectable fields includes pressing one or more soft keys displaying one or more visual identifiers associated with the at least one of the one or more user-selectable fields; and displaying the additional information associated with the at least one selected user-selectable field simultaneously with the one or more displayed checklists.

* * * * *